(12) United States Patent
Roseberry et al.

(10) Patent No.: US 7,585,346 B2
(45) Date of Patent: Sep. 8, 2009

(54) MEDIA HOLDING MODULE

(76) Inventors: Jeffrey L. Roseberry, 2656 Broadway Ave., Evanston, IL (US) 60201; Robert A. Darling, 1015 Russell Point, Suwanee, IL (US) 30024

( * ) Notice: Subject to any disclaimer, the term of this patent is extended or adjusted under 35 U.S.C. 154(b) by 207 days.

(21) Appl. No.: 11/457,422

(22) Filed: Jul. 13, 2006

(65) Prior Publication Data

US 2007/0012004 A1    Jan. 18, 2007

Related U.S. Application Data

(60) Provisional application No. 60/699,417, filed on Jul. 13, 2005.

(51) Int. Cl.
*B01D 46/10* (2006.01)
*B01D 46/12* (2006.01)
(52) U.S. Cl. .............................. 55/518; 55/484; 96/129; 96/138
(58) Field of Classification Search .................. 55/483, 55/484, 512, 516, 517, 518, 519, 502; 96/121, 96/129, 136, 138, 151, 152, 154
See application file for complete search history.

(56) References Cited

U.S. PATENT DOCUMENTS

| | | | | |
|---|---|---|---|---|
| 2,579,477 A | * | 12/1951 | Dauphinee | 96/129 |
| 2,589,229 A | * | 3/1952 | Dauphinee | 96/129 |
| 3,243,942 A | * | 4/1966 | Burke | 96/129 |
| 3,319,401 A | * | 5/1967 | Bogardus | 96/129 |
| 3,354,622 A | * | 11/1967 | Murphy, Jr. | 55/484 |
| 3,354,623 A | * | 11/1967 | Keller | 55/484 |
| 3,411,273 A | * | 11/1968 | Duncan et al. | 96/129 |
| 3,576,095 A | * | 4/1971 | Rivers | 55/484 |
| 4,969,936 A | * | 11/1990 | Schweigert et al. | 96/129 |
| 5,080,699 A | * | 1/1992 | Ho et al. | 96/129 |
| 5,733,350 A | | 3/1998 | Muller et al. | |
| 5,964,927 A | | 10/1999 | Graham et al. | |
| 6,113,674 A | * | 9/2000 | Graham et al. | 95/148 |
| 6,533,847 B2 | * | 3/2003 | Seguin et al. | 96/129 |
| 6,916,360 B2 | * | 7/2005 | Seguin et al. | 95/116 |

* cited by examiner

*Primary Examiner*—Duane Smith
*Assistant Examiner*—Robert A Clemente
(74) *Attorney, Agent, or Firm*—Levenfeld Pearlstein, LLC (57) ABSTRACT

A media holding module to hold various granular and pelletized gas phase filtration media for filtering air. The module is comprised of two solid side plates, and a perforated end panel and four perforated wall panels disposed between the side plates. The perforated wall panels are arranged in a generally "V"-shaped configuration. The interior wall panels are contoured at the module inlet to provide aerodynamic airflow. Additionally, the interior wall panels are perforated across their entire surface areas to allow for airflow access to all filtration media in the filtration media beds. The compartment created by the wall panels may be subdivided to form subcompartments capable of holding discrete beds of filtration media in series. The module's support members are located outside of the air stream to avoid airflow resistance and turbulence. The module further includes a flexible, reversible sealing system for sealing the module in the module housing in various configurations while preventing air bypass. The module can be used to filter other gases and/or fluids.

19 Claims, 11 Drawing Sheets

MEDIA HOLDING MODULE

CROSS-REFERENCE TO RELATED APPLICATIONS

This application claims the benefit of U.S. Provisional Patent Application Ser. No. 60/699,417, filed on Jul. 13, 2005, titled "Media Holding Module."

BACKGROUND OF THE INVENTION

The present invention relates generally to the field of air filtration and, more particularly, to a media holding module designed to hold various granular and palletized gas phase air filtration media.

Gas phase air filtration began in the 1960s as a way to chemically remove corrosive and/or odorous gases using a dry media. Prior to the development of potassium permanganate ($KMnO_4$) on alumina, most air scrubbing was either via liquid scrubbing towers or activated carbon.

Once a suitable media was developed, such as potassium permanganate ($KMnO_4$) on alumina, a means for supporting it in an air stream was needed. Media holding flat panels of various sizes and depths similar to those used for activated carbon initially were used. However, it ultimately was decided that a standardized size based on a convenient airflow could be the basis for sizing equipment. Standard sized media holding containers (or modules) therefore were created. The modules included perforations or openings in opposing walls through which air entered and exited. Such modules were formed of metal or plastic.

Despite advances in the analysis of airflow dynamics over the years, the design of media holding modules has changed little over time. A commonly used design consists of a flat box-like panel, much like the basic design of a traditional home HVAC filter. Perforations are formed in the large opposing walls of the module, and filtering media is poured into openings, filling the interior cavity of the module. The module then is installed into a module housing disposed in the interior of a duct so that the module occupies the entire cross-section of the duct, forcing the air to travel through the module and the filtration media contained therein. Another prior art module design uses a thin "V"-shaped chamber supported between rectangular side plates that is filled with media and similarly mounted within a duct.

However, all known prior art module designs suffer from the same shortcomings, and nobody, to applicant's knowledge, has sought to redesign the modules to overcome those shortcomings. For example, prior art modules suffer from inefficient airflow due to turbulence and resistance. Areas of dead flow media zones decrease air filtration efficiency. Poor sealing between the modules and the ducts allows air to bypass the filtration media. Pressure drops created by the design of prior art modules lead to poor media utilization. Additionally, prior art modules are not configured to maintain multiple discrete layers of filtration media as is desirable in modern filtration applications.

Accordingly, there exists a need for an improved media holding module design to overcome the limitations found in the prior art. Desirably, the media holding module is configured to hold several different media in series, in discrete and separate layers. More desirably, such a media holding module is configured with a contoured inlet that introduces air to the media earlier than in traditional prior art module designs, reduces dead flow media zones to increase media utilization and smoothes airflow to reduce drag, pressure drop and uneven airflow patterns. Most desirably, such a media holding module is configured such that its support members are outside of the airflow path.

BRIEF SUMMARY OF THE INVENTION

The present invention comprises a media holding module designed to address the inefficiencies and limitations that plague prior art module designs. The module is generally rectangular and is comprised of two solid side plates (one of which includes media fill slots), and a perforated end panel and four perforated wall panels (two interior wall panels and two exterior wall panels) all disposed between the side plates. The perforated wall panels are arranged in a generally "V"-shaped configuration, with the mouth of the "V" at the module inlet and the point of the "V" at the perforated end panel. The interior wall panels are contoured at the module inlet to provide aerodynamic airflow, thus reducing resistance and turbulence. Additionally, the interior wall panels are perforated across their entire surface areas to allow for airflow access to all filtration media in the filtration media beds.

The perforated wall panels are configured to form an internal "V"-shaped compartment with two sides for holding a bed of filtration media. In the preferred embodiment, the compartment may be subdivided using a perforated media divider panel to form sub-compartments, each sub-compartment capable of holding a discrete bed of filtration media in series. This permits multiple different filtration media to be used in a single module, thus creating a two-pass media bed that normally would require two separate modules disposed in series in an air handler.

The module also includes a flexible, reversible sealing system for sealing the module in the module housing in numerous configurations. In the preferred embodiment, the sealing system comprises a seal retaining strip integrated into sealing shoulders formed in the exterior wall panels. Flexible, renewable and reversible wiper seals are disposed on the retaining strips. The wiper seals are configured to sealingly engage the module housing support tracks, thus preventing air from exiting between the module and the module housing ("air bypass"). For bi-directional airflow applications, the wiper seals may be reversed. In one embodiment, the wiper seals may be replaced by "D"-type, or similar, compression gaskets disposed within the sealing shoulders, thereby allowing placement of two modules in a side-by-side arrangement without air bypass between modules.

The module is configured to slidably and matingly engage support tracks located inside a standard prior art module housing. The module housing is disposed in an air handling system, such as in a supply or return duct, such that the module is located in the air stream and the air is forced to pass through the module. Importantly, the module's support members for engaging the module housing support tracks are located outside of the air stream to avoid airflow resistance and turbulence.

In the preferred embodiment, the module's support members comprise "L" channel tracks disposed in the module housing that matingly engage the module side plates. The support members further comprise in the preferred embodiment a single "C" channel center support track disposed in the module housing configured to matingly engage a rectangular support bar formed at the outlet end of the module. In an alternate embodiment, the single "C" channel may be replaced by a support post and the rectangular support bar may be replaced by a recess configured to matingly engage the support post. Both of the disclosed support structures permit placement of two modules in an end-to-end configuration about a single shared center support member in a multi-stage filtration system.

These and other features and advantages of the present invention will be apparent from the following drawings and detailed description in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE PREFERRED EMBODIMENT

While the present invention is susceptible of embodiment in various forms, there is shown in the drawings and will hereinafter be described several preferred embodiments with the understanding that the present disclosure is to be considered an exemplification of the invention and is not intended to limit the invention to the specific embodiments illustrated.

It should be further understood that the title of this section of this specification, namely, "Detailed Description Of The Invention", relates to a requirement of the United States Patent Office, and does not imply, nor should be inferred to limit the subject matter disclosed herein.

The media holding module of the present invention is intended for use in air filtration, purification and treatment systems. In the context of this application, air refers primarily to a gas, but it is understood that the design and principles disclosed herein apply equally fluid filtration, and the media holding module of the present invention may be used for fluid filtration. The present invention has many improvements over current module designs including better sealing, vastly improved flow characteristics, and the option to incorporate multiple discrete media beds.

It further should be understood that directional language used in this application is solely for defining a frame of reference for use in describing the relative relationships of the elements shown, and not to indicate that any particular orientation of the modules is required during use. The modules may in fact be used bi-directionally, with air entering or exiting the inlet (the "mouth" of the "V", as discussed below). In multi-stage air filtration systems, it is expected that the modules of the present invention will be disposed in series in a back-to-back configuration such that air enters the inlet of one module and exits the inlet of the succeeding module.

Figure 1:
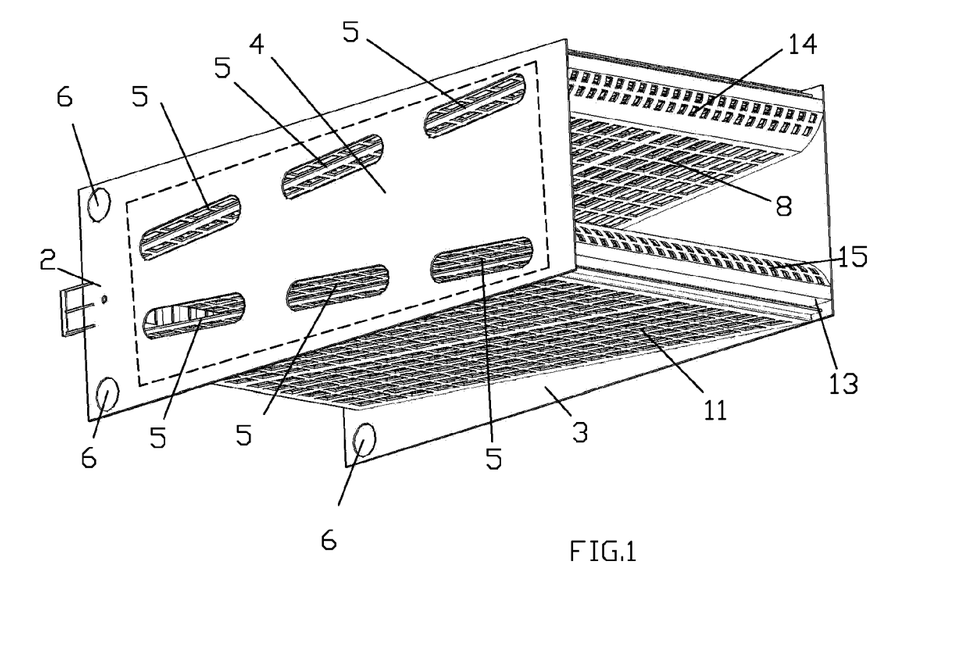
FIG. 1 is a perspective view of the media holding module of the present invention.
Figure 2:
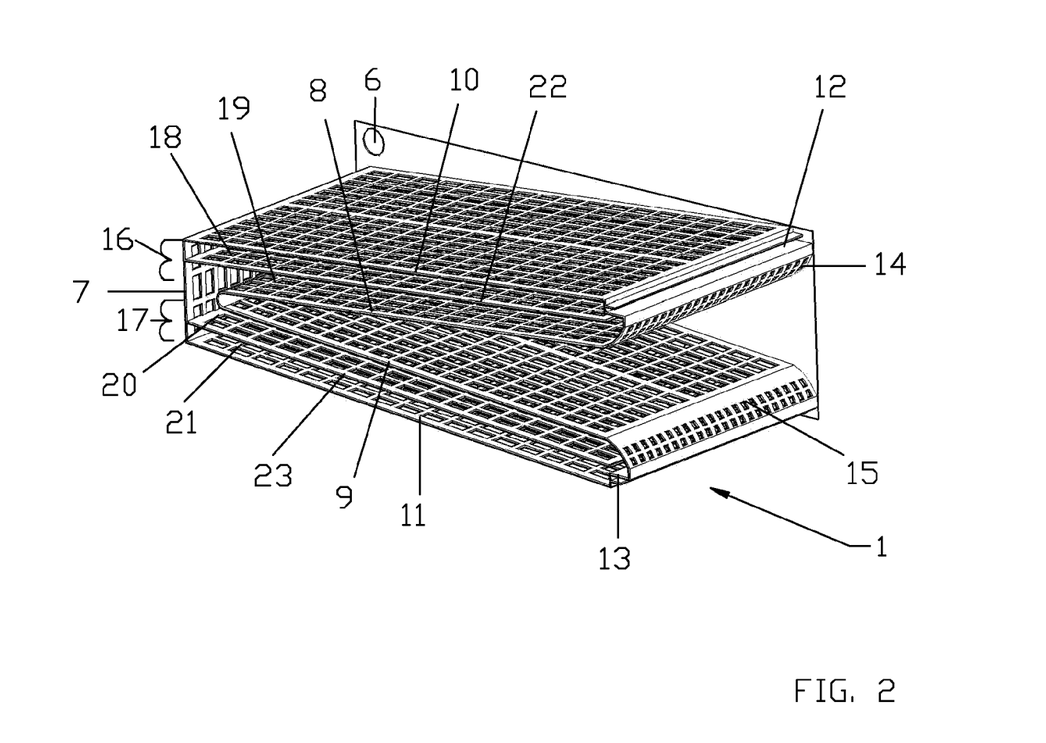
FIG. 2 is a perspective view of the media holding module of the present invention with one side plate removed.
Figure 3:
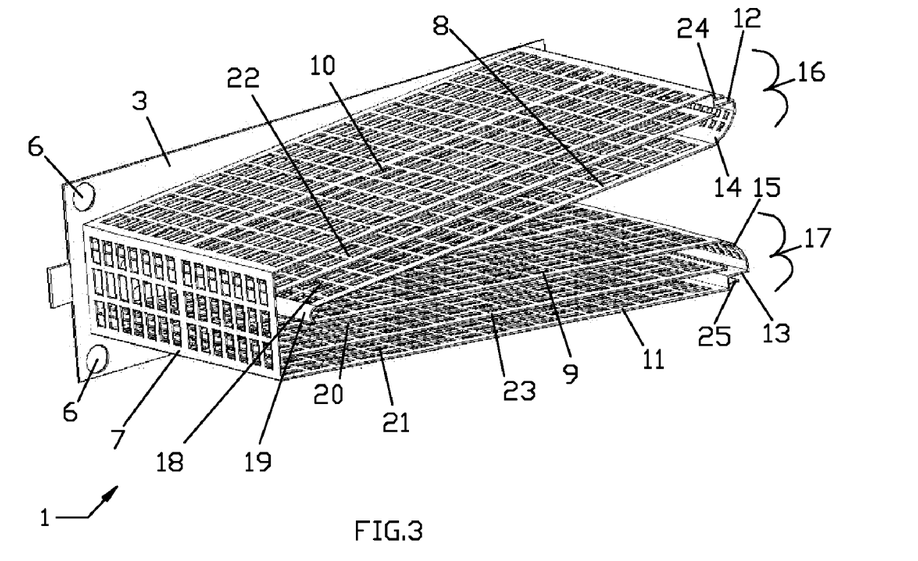
FIG. 3 is an additional perspective view of the media holding module of the present invention with one side plate removed.

As shown in FIGS. 1 through 3, media holding module 1 of the present invention is generally rectangular and is configured to be disposed within a prior art module housing (not shown) integrated in a prior art air handling system (not shown). It will be appreciated, however, that module 1 may take on various geometric shapes as necessary for a particular application and to fit within the dimensions of a particular air handling system. Typically, the module housing is located in a supply or return duct, such that the module 1 is located in the air stream and the air is forced to pass through the module and the air filtration media contained therein. Module 1 is constructed of mild steel in the preferred embodiment, but can be constructed from stainless steel, plastic or any similar suitable material.

In the preferred embodiment, module 1 is approximately 7¾ inches high by 12 inches wide by 24 inches deep. However, without departing from the scope of this disclosure, module 1 may span a range of sizes, from approximately 4 inches to 18 inches high by 4 inches to 28 inches wide by 10 inches to 30 inches deep, depending on the size of, and the available space within, the particular air handling system. However, it will be appreciated that modules with particularly large dimensions may require additional internal support members (not shown).

Module 1 is designed in the preferred embodiment to hold a wide variety of granular and pelletized gas phase air filtration media, such as potassium permanganate ($KMnO_4$) on alumina. In the preferred embodiment, the media is sized in a range from 1/16 inch to 3/8 inch in diameter and/or up to ½ inch long. It will be appreciated, however, that module 1 of the present invention may hold media of many different sizes as long as the media dimensions are larger than the size of the perforations in the end panel and wall panels (as discussed below). If necessary, however, the size of the perforations could be altered to accommodate different sized media without departing from the scope of the present invention.

Media holding module 1 is comprised of two solid side plates, a left side plate 2 and a right side plate 3. In the preferred embodiment, left side plate 2 includes a removable access panel 4 underneath which are disposed a plurality of fill holes 5 configured to allow air filtration media to be added and removed from module 1. However, it will be appreciated that fill holes 5 may be disposed in right side plate 3, or in both left side plate 2 and right side plate 3, without departing form the scope of the present invention. Moreover, in some embodiments, such as when module 1 is constructed of plastic, left side plate 2 may not include removable access panel 4 but, rather, holes 5 may be covered by removable paper labels, plastics plugs, tape or any other suitable material adapted to removingly disposed over or in holes 5.

Left side plate 2 and right side plate 3 further include a plurality of finger holes 6, in the preferred embodiment, disposed along the edges of left side plate 2 and right side plate 3 to assist with installation and removal of module 1 from the module housing.

Module 1 further comprises a perforated end panel 7 and four perforated wall panels (two interior wall panels 8 and 9, and two exterior wall panels 10 and 11) all disposed between left side plate 2 and right side plate 3. Interior wall panels 8 and 9 are arranged in a generally "V"-shaped configuration, with the mouth of the "V" at the module inlet and the point of the "V" at a distance before end panel 7. Exterior wall panels 10 and 11 also are arranged in a generally "V"-shaped configuration in parallel alignment with interior walls 8 and 9, respectively, with the mouth of the "V" at the module inlet. However, exterior wall panels 10 and 11 terminate at opposing ends of end panel 7 without forming the point of the "V."

Interior wall panels 8 and 9 and end panel 7 are perforated across their entire longitudinal surface areas. Exterior wall panels 10 and 11 are perforated across their entire longitudinal surface areas, except for sealing shoulders 12 and 13 (further discussed below) that are non-perforated. The perforations are sized and configured to allow air to freely pass through them with minimal resistance and pressure drop while retaining the air filtration media within module 1.

In the preferred embodiment, the perforations comprise a plurality of evenly sized and spaced holes disposed in a regular, repeating pattern. In one embodiment, the holes are circular and are disposed in an alternating, honeycomb-style design. In another embodiment, such as the embodiment shown in FIGS. 1 through 3, may utilize a generally rectangular slotted hole design. It will be appreciated, however, that any size, shape and pattern of holes may be used so long as airflow is maximized and pressure is minimized.

In the preferred embodiment, interior wall panels 8 and 9 include are configured with wrap-around arcuate ends 14 and 15, respectively. Arcuate ends 14 and 15 serve to connect interior wall panels 8 and 9 to exterior wall panels 10 and 11, respectively, to form an internal air filtration media holding compartment comprised of two sides, an upper side 16 and a lower side 17. Arcuate ends 14 and 15 further are designed to provide for aerodynamic airflow at the inlet of module 1, thus reducing resistance and turbulence, improving air filtration media utilization, lowering bed velocity and removing any orifice-type vena contracta effects associated with the sharp, truncated openings of prior art modules.

Additionally, since arcuate ends 14 and 15 of interior wall panels 8 and 9 are perforated and serve as the leading air contact surface of module 1, unlike prior art modules, air comes in contact with the air filtration media held within module 1 much sooner than in prior art module designs. Furthermore, the air filtration media located in media holding compartment upper side 16 and lower side 17 immediately behind arcuate ends 14 and 15 is fully utilized, whereas air could not reach such media in prior art module designs.

As discussed above, media holding compartment upper side 16 and lower side 17 are bounded by interior wall 8 and exterior wall 10 and interior wall 9 and exterior wall 11, respectively. Upper side 16 and lower side 17 are designed to hold air filtration media (not shown) within them and within the "V"-shaped compartment created by them. Preferably, upper side 16 and lower side 17 each are approximately 2 inches wide, allowing for a 2 inch bed of air filtration media to be disposed therein. It will be appreciated, however, that the width of upper side 16 and lower side 17 may vary depending upon the overall size and geometry of module 1.

As shown in FIGS. 2 and 3, in the preferred embodiment of module 1 of the present invention, upper side 16 and lower side 17 may be subdivided using optional media dividers 22 and 23 to form four sub-compartments 18, 19, 20 and 21. Sub-compartments 18 and 21 each are capable of holding a discrete bed of air filtration media, while sub-compartments 19 and 20, which join to form a single "V"-shaped compartment, are capable of holding a separate discrete bed of air filtration media in series with sub-compartments 18 and 21. This permits different types, sizes and/or compositions of air filtration media to be used in a single module 1, thus creating a two-pass media bed that normally would require two separate modules 1 disposed in series in an air handler. This is a significant improvement over prior art modules. In the preferred embodiment, upper side 16 and lower side 17 are evenly divided by media dividers 22 and 23 such that sub-compartments 18, 19, 20 and 21 each are 1 inch wide, allowing for a 1 inch bed of air filtration media to be disposed therein.

To load air filtration media into upper side 16 and lower side 17 (or sub-compartments 18, 19, 20 and 21), in the preferred embodiment, fill holes 5 in left side plate 2 are aligned over upper side 16 and lower side 17 (or sub-compartments 18, 19, 20 and 21) such that air filtration media may be poured into upper side 16 and lower side 17 (or sub-compartments 18, 19, 20 and 21), filling the entire internal volume of upper side 16 and lower side 17 (or sub-compartments 18, 19, 20 and 21). Similarly, used air filtration media may be removed from upper side 16 and lower side 17 (or sub-compartments 18, 19, 20 and 21) by pouring the media out through fill holes 5 in left side plate 2.

As shown in FIGS. 1 through 9, module 1 further comprises a flexible, reversible sealing system for sealing module 1 in the module housing in numerous configurations. In the preferred embodiment, the sealing system comprises seal retaining strips 24 and 25 integrated in sealing shoulders 12 and 13, respectively, formed in the exterior wall panels 10 and 11, respectively. For ease of reference, FIGS. 4 through 8 show only sealing shoulder 13 and its surrounding elements. It will be appreciated, however, sealing shoulder 12 is configured in an analogous manner.

Figure 4:
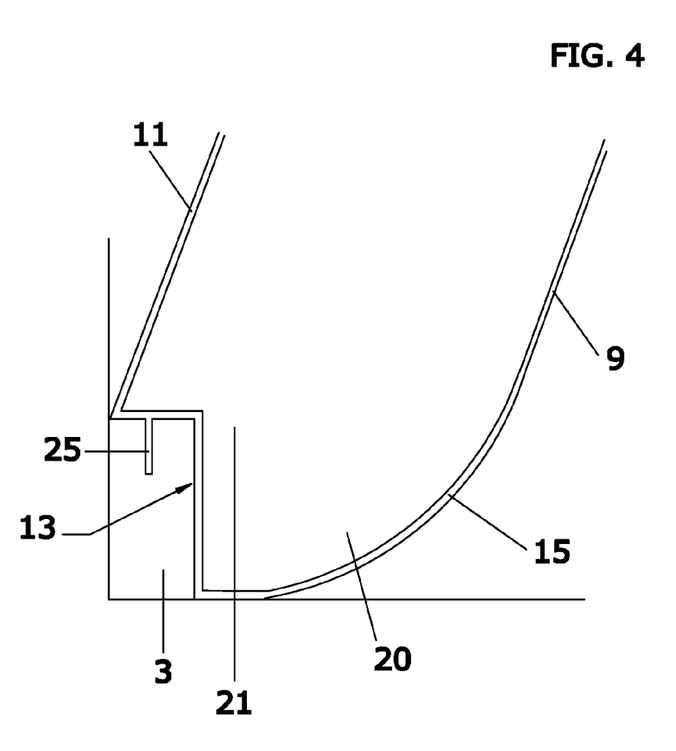
FIG. 4 is an enlarged fragmentary cross-sectional view of the interface between an interior wall panel and an exterior wall panel in the media holding module of the present invention.
Figure 5:
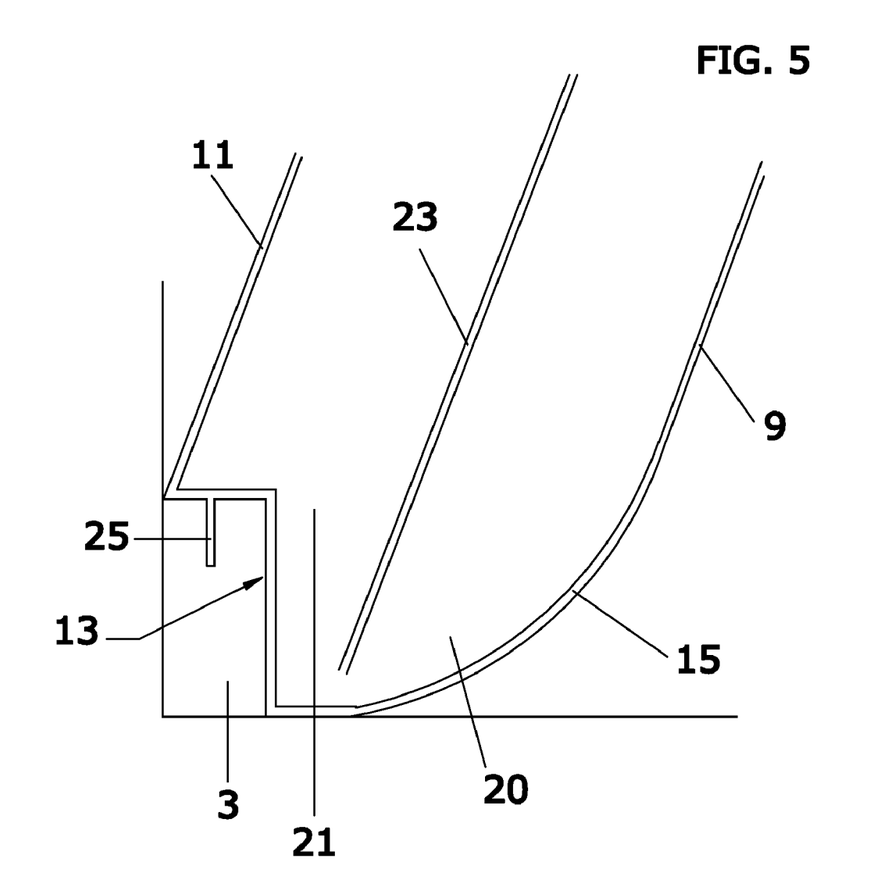
FIG. 5 is an enlarged fragmentary cross-sectional view of the interface between an interior wall panel and an exterior wall panel with a media divider panel in the media holding module of the present invention.

As shown in FIG. 4, sealing shoulder 13 is integrated in exterior wall panel 11 and forms the connection between exterior wall panel 11 and interior wall panel 9. As discussed above, lower side 17 is bounded by exterior wall panel 11 and interior wall panel 9. FIG. 5 shows the same configuration except for the addition of media divider 23 creating sub-compartments 20 and 21 that are bounded by exterior wall panel 11 and interior wall panel 9 and media divider 23.

Seal retaining strip 25 is formed within sealing shoulder 13 as a linear support member traversing the length of sealing shoulder 13 in a continuous form, from left side plate 2 to right side plate 3.

Figure 6:
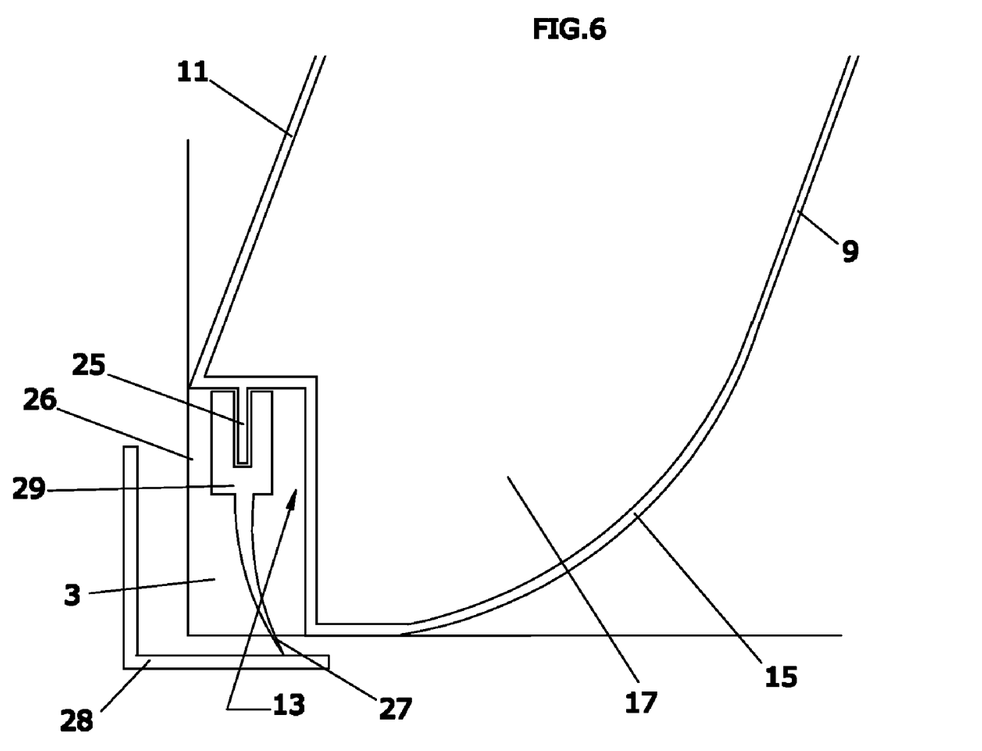
FIG. 6 is an enlarged fragmentary cross-sectional view of the interface between an interior wall panel and an exterior wall panel in the media holding module of the present invention showing a wiper seal as configured when air is entering the inlet (standard flow)

As shown in FIG. 6, strip 25 is configured to allow attachment of wiper seal 26 that also traverses the length of sealing shoulder 13 in a continuous form. Wiper seal 26, in the preferred embodiment, comprises a commercially available wiper seal having base 29 for mating attachment to strip 25, and flexible blade 27. Flexible blade 27 extends beyond the perimeter of right side plate 3 of module 1 to provide a mechanical seal against a mating surface of "L" channel track 28 of a module housing.

Figure 7:
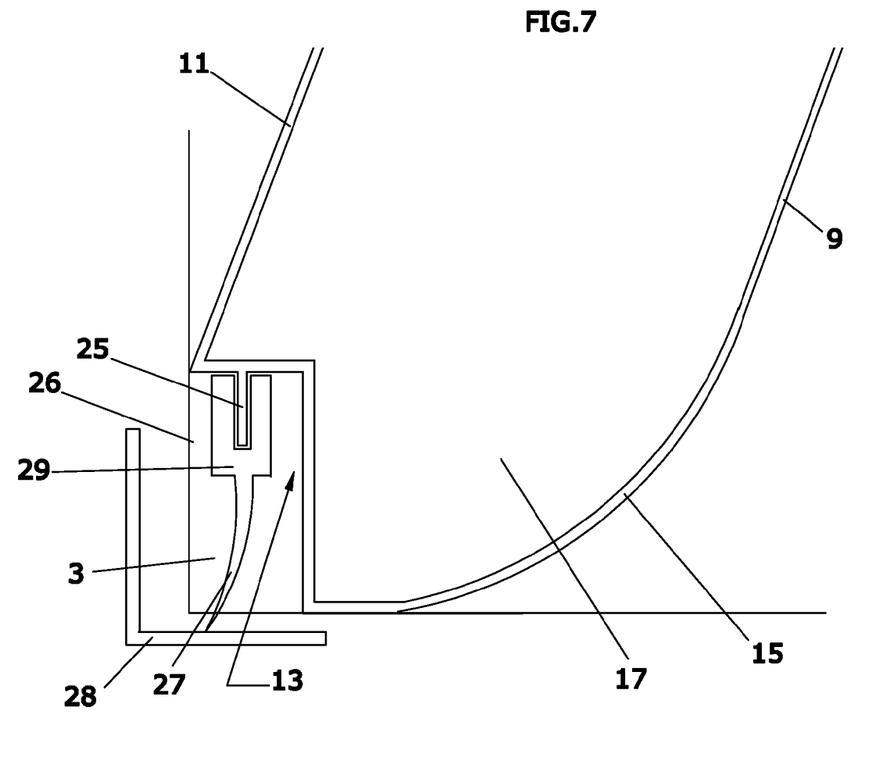
FIG. 7 is an enlarged fragmentary cross-sectional view of the interface between an interior wall panel and an exterior wall panel in the media holding module of the present invention showing a wiper seal as configured when air is exiting the inlet (reverse flow)
Figure 8:
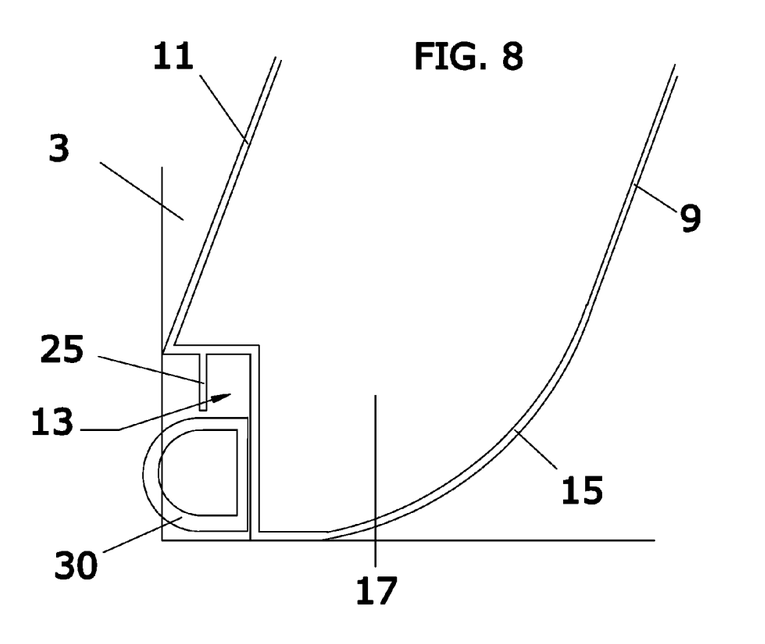
FIG. 8 is an enlarged fragmentary cross-sectional view of the interface between an interior wall panel and an exterior wall panel in the media holding module of the present invention showing a "D"-type gasket as configured for a side-by-side arrangement of modules.
Figure 9:
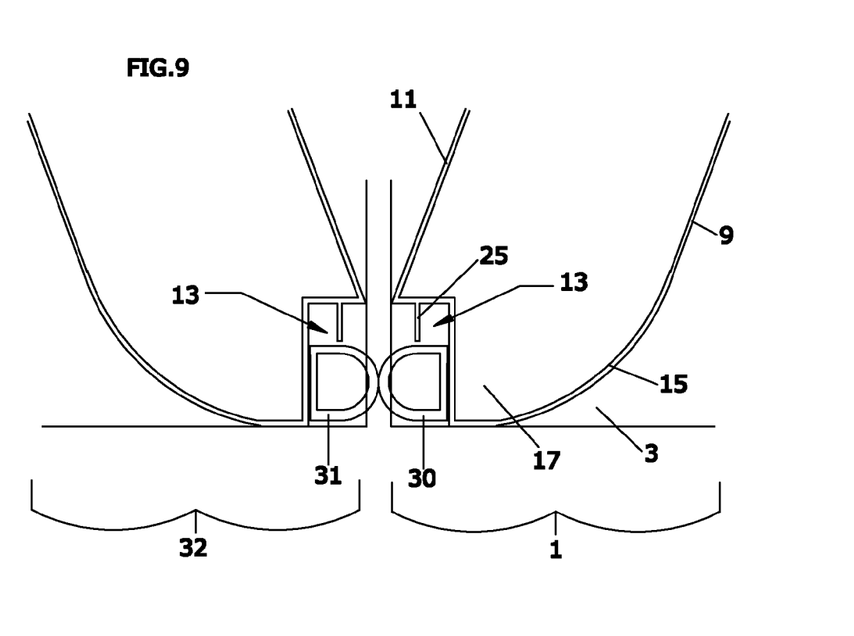
FIG. 9 is an enlarged fragmentary cross-sectional view of the interface between an interior wall panel and an exterior wall panel in two side-by-side media holding modules of the present invention showing the engagement of the "D"-type gaskets of each of the modules.

When module 1 is used in a configuration in which air enters module 1 through the inlet (a standard flow configuration), blade 27 is configured such that it is deformed in the direction of the inlet (the mouth of the "V") as shown in FIG. 6. Such a configuration provides a strong seal as the high pressure incoming air exerts a force against blade 27 biasing it against "L" channel track 28 to form a tight seal. When module 1 is used in a configuration in which air exits module 1 through the inlet (a reverse flow configuration), blade 27 is configured such that it is deformed in the opposite direction of the inlet, as shown in FIG. 7. Such a configuration provides a strong seal as the high pressure exiting air exerts an opposing force against blade 27 biasing it against "L" channel track 28 to form a tight seal.

The tight seal created by the sealing system of the present invention greatly reduces air bypass as compared to the prior art. Moreover, since wiper seal 26 is easily replaceable, it may be replaced any time module 1 is removed for renewal of the air filtration media. It will be appreciated, however, that any number of seal materials and geometries may serve to provide a seal sufficient to prevent the bypass of air flow between module 1 and "L" channel track 28, and the present disclosure not limited to the particular seal system disclosed.

In another embodiment of the media holding module of the present invention, wiper seal 26 is replaced by a compression-type seal, foam or other resilient sealing device attached to sealing shoulder 13 apart from seal retaining strip 25. In one such embodiment, shown in FIGS. 8 and 9, a "D"-type compression gasket 30 is adhesively attached to a wall of sealing shoulder 13. Gasket 30 traverses the length of sealing shoulder 13 in a continuous form and is configured such that gasket 30 extends beyond the perimeter of right side plate 3.

This sealing arrangement is particularly useful in instances when module 1 must be placed in a side-by-side configuration with a second module (referred to generally as 32 in FIG. 9) also having an opposing "D"-type compression gasket 31. When modules 1 and 32 are placed in an adjacent side-by-side configuration, gaskets 30 and 31 compress against one another forming a tight seal and preventing the bypass of air flow between modules 1 and 32. It will be appreciated, however, that any number of seal materials and geometries may serve to provide a seal sufficient to prevent the bypass of air flow between modules 1 and 32, and the present disclosure is not limited to the particular seals disclosed.

Module 1 is further configured to slidably and matingly engage a plurality of support tracks located inside a standard prior art module housing. As discussed above, the module housing is disposed in an air handling system, such as in a supply or return duct, such that module 1 is located in the air stream and the air is forced to pass through module 1 and the air filtration media located therein. Importantly, unlike the prior art, the various support members for supporting module 1 within the module housing are located outside of the air stream to avoid airflow resistance and turbulence.

Figure 10:
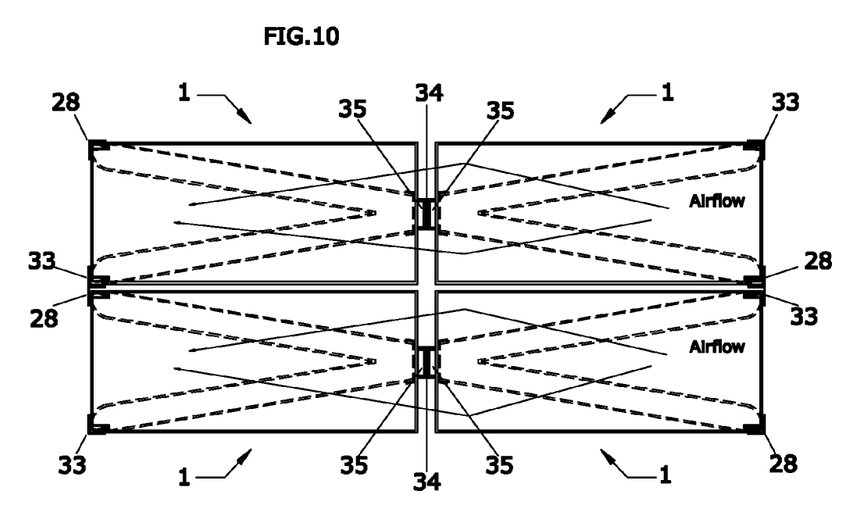
FIG. 10 is a cross-sectional view of four media holding modules of the present invention disposed in a back-to-back and side-by-side configuration for operation in a multi-stage air filtration system using a shared center "C" channel support and rectangular support bars.

In the preferred embodiment, as shown in FIGS. 6, 7 and 10, the support members comprise "L" channel tracks 28 and 33 disposed in the module housing that matingly engage right side plate 3 and left side plate 2, respectively, of module 1 to support module 1 in the module housing. The support members further comprise in the preferred embodiment a single "C" channel center support track 34 disposed in the module housing and configured to matingly engage a rectangular support bar 35 formed at the outlet end of the module adjacent to end panel 7. As shown in FIG. 10, the location of "L" channel tracks 28 and 33 and "C" channel center support track 34 outside of the air stream allows multiple modules 1 (four modules 1 as shown in FIG. 10) to be disposed in a back-to-back and side-by-side configuration for operation in a multi-stage air filtration system without the resistance and turbulence associated with such configurations using prior art modules.

Figure 11:
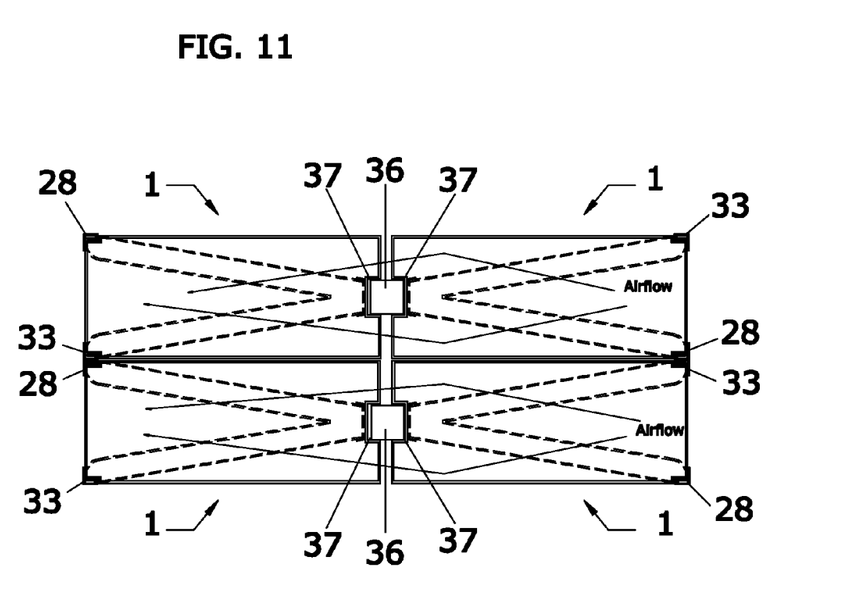
FIG. 11 is a cross-sectional view of four media holding modules of the present invention disposed in a back-to-back and side-by-side configuration for operation in a multi-stage air filtration system using a shared center support post and mating recesses.

In an alternate embodiment, shown in FIG. 11, single "C" channel center support track 35 may be replaced by a single center support post 36 disposed in the module housing and rectangular support bar 34 may be replaced by a recess 37 configured to matingly engage support post 36. As in the preferred embodiment, the location of "L" channel tracks 28 and 33 and center support post 36 outside of the air stream allows multiple modules 1 (four modules 1 as shown in FIG. 11) to be disposed in a back-to-back and side-by-side configuration for operation in a multi-stage air filtration system without the resistance and turbulence associated with such configurations using prior art modules.

It will be appreciated, however, that "L" channel tracks 28 and 33, "C" channel center support track 34 and/or center support post 36 may be substituted with any number of alternate support members, structures and/or geometries configured to adequately support module 1 (or multiple modules 1) within the module housing, without departing from the scope of the present disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

What is claimed is:

1. A media holding module for holding filtration media and configured to be supported within a module housing, the module comprising:
    a first solid side plate;
    a second solid side plate;
    a perforated end panel; and
    a plurality of perforated wall panels;
    wherein the perforated end panel and the plurality of perforated wall panels are disposed between the first solid side plate and the second solid side plate and configured to form an inlet end of the module and an outlet end of the module, the inlet end having a top and a bottom;
    wherein the perforated end panel and the plurality of perforated wall panels are configured to form at least one compartment for holding the filtration media;
    wherein at least two of the plurality of perforated wall panels are disposed in a non-parallel relationship;
    wherein at least two of the plurality of perforated wall panels comprise arcuate ends formed integral with the top of the inlet end of the module and the bottom of the inlet end of the module; and wherein at least two of the plurality of perforated wall panels further comprise a sealing shoulder.

2. The media holding module of claim 1 wherein the plurality of perforated wall panels comprises a first interior perforated wall panel, a second interior perforated wall panel, a first exterior perforated wall panel and a second exterior perforated wall panel.

3. The media holding module of claim 1 further comprising a perforated media divider disposed within the at least one compartment and configured to divide the at least one compartment into at least two discrete sub-compartments.

4. The media holding module of claim 3 wherein the at least two discrete sub-compartments are configured to hold at least two discrete filtration media beds.

5. The media holding module of claim 1 wherein at least two of the plurality of perforated wall panels terminate at the end panel.

6. The media holding module of claim 2 wherein the first exterior perforated wall panel and the second exterior perforated wall panel terminate at the end panel.

7. The media holding module of claim 2 wherein the at least two of the plurality of perforated wall panels that comprise arcuate ends formed integral with the top of the inlet end of the module and the bottom of the inlet end of the module comprise the first interior perforated wall panel and the second interior perforated wall panel.

8. The media holding module of claim 1 wherein the first solid side plate and the second solid side plate further comprise at least one finger hole.

9. The media holding module of claim 1 wherein the first solid side plate further comprises at least one fill hole configured to add to and remove from the at least one compartment the filtration media.

10. The media holding module of claim 2 wherein the at least two of the plurality of perforated wall panels that further comprise the sealing shoulder are the first exterior perforated wall panel and the second exterior perforated wall panel.

11. The media holding module of claim 1 wherein the sealing shoulder further comprises a seal retaining strip.

12. The media holding module of claim 10 wherein the sealing shoulder further comprises a seal retaining strip.

13. The media holding module of claim 11 further comprising a wiper seal matingly mounted to the seal retaining strip.

14. The media holding module of claim 12 further comprising a wiper seal matingly mounted to the seal retaining strip.

15. The media holding module of claim 1 further comprising a compression gasket adhesively mounted to the sealing shoulder.

16. The media holding module of claim 10 further comprising a compression gasket adhesively mounted to the sealing shoulder.

17. The media holding module of claim 1 further comprising a support bar disposed at the outlet end of the module and configured to matingly and supportingly engage a channel support track in the module housing.

18. The media holding module of claim 1 further comprising a recess disposed at the outlet end of the module and configured to matingly and supportingly engage a support post in the module housing.

19. The media holding module of claim 1 wherein the first solid side plate and the second solid side plate are configured to matingly and supportingly engage a plurality of channel tracks in the module housing.

* * * * *

UNITED STATES PATENT AND TRADEMARK OFFICE
CERTIFICATE OF CORRECTION

PATENT NO.       : 7,585,346 B2                                    Page 1 of 1
APPLICATION NO. : 11/457422
DATED            : September 8, 2009
INVENTOR(S)      : Roseberry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 264 days.

Signed and Sealed this

Fourteenth Day of September, 2010

David J. Kappos
*Director of the United States Patent and Trademark Office*